Oct. 24, 1972     W. S. SULLIVAN     3,700,516

METHOD OF MAKING CELLULAR PLASTIC BUILDING PANEL

Filed Dec. 29, 1970

*INVENTOR.*
WAYNE S. SULLIVAN
BY
ATTORNEY

United States Patent Office 3,700,516
Patented Oct. 24, 1972

3,700,516
METHOD OF MAKING CELLULAR PLASTIC BUILDING PANEL
Wayne S. Sullivan, Iowa City, Iowa, assignor to Camelot Stone, Inc., Iowa City, Iowa
Filed Dec. 29, 1970, Ser. No. 102,437
Int. Cl. B32b 5/18, 31/14
U.S. Cl. 156—79        4 Claims

ABSTRACT OF THE DISCLOSURE

A method for producing decorative building panels for use in both exterior and interior construction. The panels have an insulating cellular plastic core with a cement veneer permanently bonded to the core. The exposed veneer surface of the panel can be of any desired shape or color to simulate brick, stone, etc., and is produced by making an impression in a bed of dry cement and allowing liquid plastic to solidify in the molds thus formed. The liquid plastic will form a solid core with a thin veneer of the dry cement impregnated to it, the veneered surface having the shape of the initial impression made.

BACKGROUND OF THE INVENTION

In recent years, conventional construction techniques and materials have been greatly improved through the use of new methods and new materials which have been developed. Because of these new methods, materials and construction products, architects and other designers and builders have been able to create extremely attractive and functional structures. However, those responsible for design of new structures are always looking for new techniques and products which they can utilize to carry out their ideas.

The development of foamable plastic compositions which form a solidified closed cell structure has permitted the creation of a number of different constructions in which this light weight plastic material is used as the core for building panels. For example, because of its extremely light weight and insulating properties, foamable plastics have been utilized as the core in various "sandwich" constructions in which plywood, prefinished panelling, sheet metal, etc. have been used as the outer layer of the finished product. In this manner, a light weight, easy to handle panel with excellent insulating quality can be utilized and applied to a supporting structure to provide the finished structure. Quite a wide variety of surfaces have been applied to these foamable plastic cores, but their use has been somewhat limited because the finished product is normally not fire resistant or moisture proof. As a result, use of these panels has been limited primarily to interior structures that are not exposed to the weather. Also, there is not shown in the prior art any suitable method by which said products can be produced with an irregular exterior surface which will accurately simulate brick, stone, or other like materials. The few such processes and products produced thereby which have been attempted have not resulted in satisfactory products for reasons of cost, difficulties in production and difficulties in producing a product which has a realtistic finished appearance.

SUMMARY OF THE INVENTION

I have devised a novel method of producing a building panel which has a decorative exterior surface that realistically simulates brick or stone or any other desired surface, regular or irregular in shape. My novel method produces a finished product that not only has the appearance but the feel and texture of brick, stone, etc. Such a product is produced by my novel method by creating an impression in a bed of powdered material, such as cement, the impression being that desired on the finished panel. Cavities created by the impression are then filled with a liquid plastic foamable material which is allowed to solidify in the molds formed by the cavities. In solidifying and curing the plastic material, a thin surface coating of the dry material will become impregnated in the foamed plastic core, thus resulting in a panel having the shape originally created by the impression in the bed of the dry material. If desired, additional material can be applied to the veneered surface without any difficulty in creating a permanent bond. However, if the bed is properly prepared of the materials desired on the finished panel, additional application of material may not be necessary.

DESCRIPTION OF THE PREFERRED EMBODIMENT OF THE INVENTION

Figure 1:
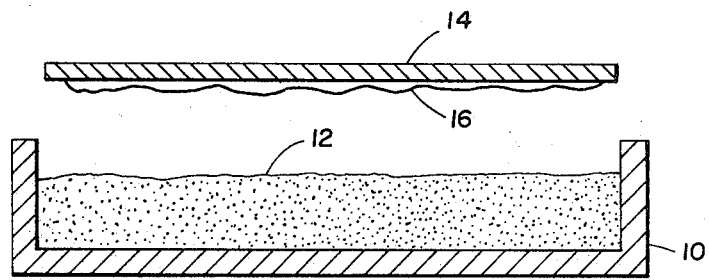
FIG. 1 is a sectional view of a mold and frame of a type suitable in carrying out my novel method and illustrating the initial step of the method.

In producing a product by my novel method, it will be understood that panels of any desired size can be made depending upon the dimensions of the frame 10 that is employed. Normally, the frame 10 will have interior dimensions corresponding to the exterior dimensions of the finished panel. Standard sizes which might be produced, for example, would be 4' x 8' or 4' x 4' panels. As illustrated in the drawing, the frame 10 provides sides and a bottom surface capable of containing the dry powdered material 12. This material may be Portland cement, silica sand, or a mixture thereof and may be made in a variety of colors depending upon the texture and color desired in the finished panels. This material 12 is placed in the frame 10 so that it covers the entire bottom surface thereof to the desired depth, which depends in part on the depth of the cavities to be created. An impression board 14 is used, which board is of approximately the same width and height of the finished panel. The entire surface on one side of the board 14 is then preformed to the configuration desired in the finished panel. This illustrated in FIG. 1 by the surface 16 on the impression board 14. For example, if a simulated stone finish is desired on the finished panel, the desired three-dimensional configuration, including mortar joints, would be formed on the entire surface 16 of impression board 14. This impression board 14 can then be used to produce any desired number of panels with that same configuration.

With the bed of dry powdered material 12 contained in the frame 10, the impression board 14 is placed in the frame 10 with the surface 16 in contact with the bed of material 12. Sufficient pressure is applied to the top surface of the impression board 14 so as to compress the material 12 and create a mirror impression of surface 16 in the cement bed 12. Impression board 14 is then carefully removed.

The cavities created in the bed of dry material 12 by the impression board 14 are then filled with any suitable foamable composition which when cured will form a solidified closed cell structure that is light in weight and has good insulating qualities. An example of a suitable foamable plastic material is low density polyurethane foam which is commercially avaliable in a liquid form. It is well known to those skilled in the art, that as this material cures, gas is trapped in the reaction mass and expands the material into a cellular light weight structure. The structure and properties of the solidified plastic foam will depend primarily upon the materials selected and the reactants employed in curing the material, and a wide range of properties can be obtained by proper selection and control of these variables. Such a material when cured has many desirable qualities for structural building panels since it is resistant to moisture and rot and has relatively high strength-to-weight ratio. The technology employed in the use of these foamable plastic materials has been sufficiently developed in recent years and the material is readily available in abundant quantities at a reasonble cost.

Figure 2:
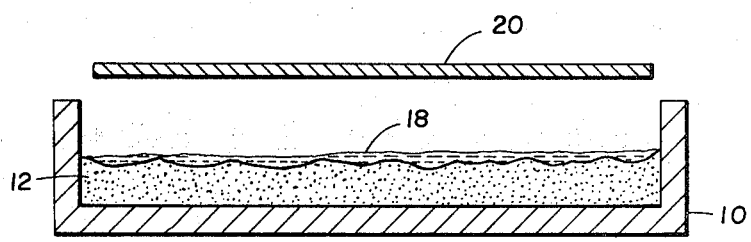
FIG. 2 is a sectional view similar to FIG. 1 and showing the succeeding steps.
Figure 3:
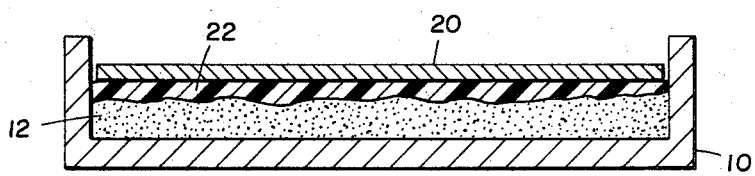
FIG. 3 is a sectional view similar to FIG. 1 and FIG. 2 and showing the succeeding step in the method in which the core is formed.

The particular foamable plastic material selected is used in a liquid form and poured into the cavities formed by the impression board 14 in the bed of dry powdered material 12. This is illustrated in FIG. 2 which shows the liquid material 18 filling the cavities. When the necessary reactants are added to the liquid material 18, the mold within the frame 10 is covered by a pressed board 20. The purpose of this board is to control the expansion of the material 18 as it cures and also to form a flat surface on the back side of the finished panel.

Figure 4:
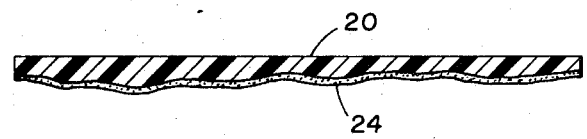
FIG. 4 is a section view through a finished panel produced by my novel method.

When the liquid foamable material 18 has completely cured, the now formed core 22 will be a light-weight, solid, cellular plastic structure with the properties previously referred to. During the curing process, however, a thin veneer 24 of the dry powdered material 12 will become impregnated in the core 22, this veneer 24 being a thin coating having the configuration of the impression made initially by the impression board 14. The thin veneer coating 24 will be permanently bonded to the core 22 and will have the desired configuration, color, and texture, depending upon the dry powdered material 12 used initially. In many cases, the panel thus produced and illustrated in cross-section in FIG. 4 will be the finished product. In other cases, where a thicker veneer 24 is desired, additional material can now be applied to the veneer 24. This can be easily done and a permanent bond created because the additional material applied will easily bond to the veneered surface 24. If, however, a panel were produced containing only the cellular plastic material wtih an irregular configuration, the cement or other material could not be satisfactorily applied to the core after the core has cured. It is therefore an essential part of my method that the curing take place in a bed of the dry powdered material so that the permanent bond is created between the core 22 and the veneer 24.

A finished product made according to my novel method produces a building panel with an exposed surface that accurately and realistically simulates rock, brick, etc. Once the panel is in place it is practically impossible to determine that this is not the real thing. At times, the individual stones will be cut from the panel before additional material is applied. The individual stones thus formed are cemented in place on a wall and mortar applied in the joints. In either case, the veneer surface 24 will have the feel, texture, appearance, and color of the real product that is being simulated.

Moreover, the impregnation of the veneer 24 into the core 22 seals the core 22 from moisture and all elements of weather. These panels can therefore be used for exterior purposes as well as interior use. In addition, the permanently bonded veneer 24 provides sufficient fire resistance so that these panels will meet existing building codes. The panels, of course, will be extremely lightweight and therefore no special structural design is required in order to support them. They can therefore be used almost anywhere using existing structural designs. The joints between the panels can be filled with the same material that forms the bed 12 and thus when the entire construction is finished it has the appearance of a real brick or stone wall without the cost, weight and time involved in producing and constructing such a wall.

Having thus described my invention, it will be obvious to those skilled in the art that various revisions and modifications can be made in my novel method and product without departing from the spirit and scope of the invention. It is my intention, however, that all such revisions and modifications as are obvious to those skilled in the art, will be included within the scope of the following claims:

I claim:

1. A method of making insulated decorative building panels and the like comprising the steps of: preparing a bed of a dry powdered material that is to form an exterior surface of said panel; forming an impression in said bed of the configuration desired on said exterior surface of said panel when finished; filling the cavities formed by said impression and covering the bed with a liquid self-curing plastic cellular foam material; and allowing said plastic foam material to solidify to form a cellular rigid structure with a thin coating of said dry powdered material impregnated therein on said exterior surface.

2. The method of claim 1 in which said bed of dry powdered material is compressed as said impression is formed.

3. The method of claim 1 in which prior to allowing said plastic foam material to solidify said material is covered entirely with a rigid member having a smooth flat surface so as to confine the expansion of said foam material as it solidifies and to provide a flat smooth surface opposite the surface in which said powdered material is impregnated.

4. The method of claim 1 in which the dry powdered material forms a weather-tight moisture proof coating over the entire surface of said solidified plastic foam material that was in contact with said bed of dry powdered material.

References Cited

UNITED STATES PATENTS

| | | | |
|---|---|---|---|
| 2,953,469 | 9/1960 | Fox | 117—9 |
| 2,888,360 | 5/1959 | Sherts et al. | 117—8 |
| 3,298,433 | 1/1967 | Lemelson | 165—168 |
| 2,454,910 | 11/1948 | Carr | 156—245 X |
| 3,295,278 | 1/1967 | Muhm | 52—223 |
| 3,492,192 | 1/1970 | Bullard | 161—162 X |
| 3,504,063 | 3/1970 | Lemelson | 264—24 |
| 3,511,007 | 5/1970 | Babcock | 52—309 |

FOREIGN PATENTS

| | | | |
|---|---|---|---|
| 606,181 | 10/1960 | Canada | 264—45 |
| 771,084 | 11/1967 | Canada | 264—45 |

WILLIAM A. POWELL, Primary Examiner

U.S. Cl. X.R.

52—309; 156—245; 161—119, 159, 162; 264—45